UNITED STATES PATENT OFFICE 2,612,986

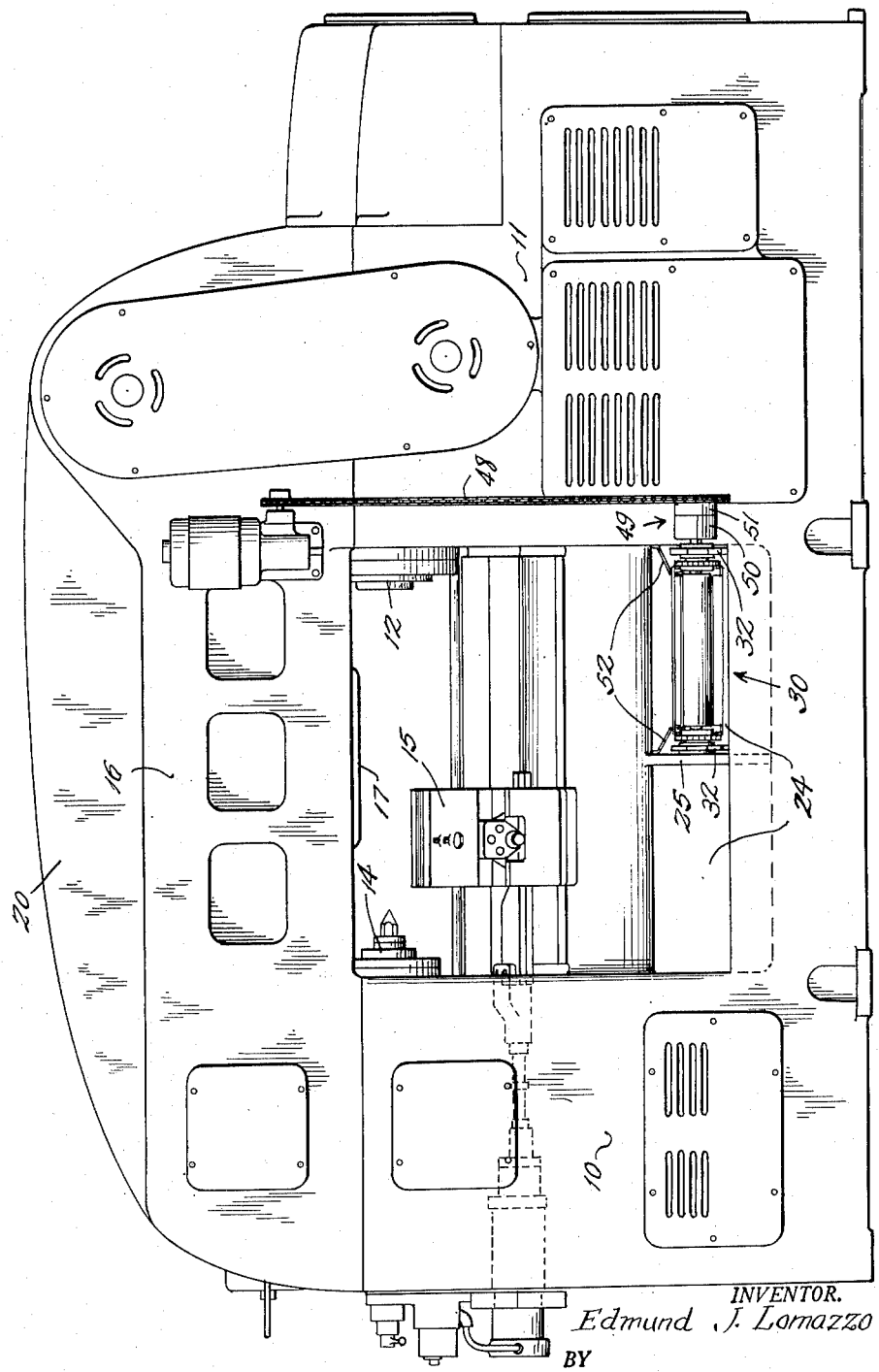

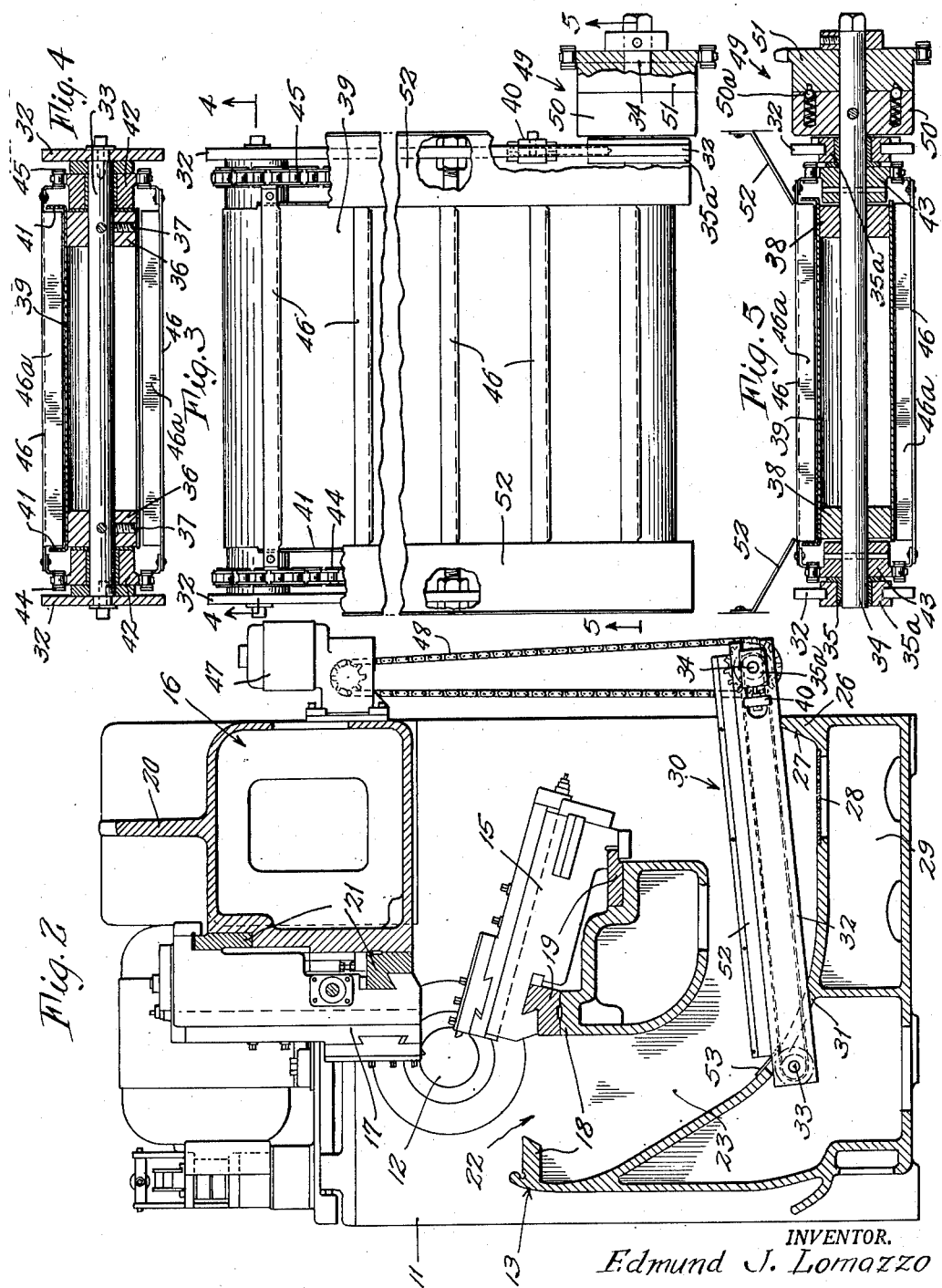

CHIP CONVEYING MEANS

Edmund J. Lomazzo, Norwalk, Conn., assignor to Sparks Machine Tool Corporation, Norwalk, Conn., a corporation of Connecticut Application September 25, 1948, Serial No. 51,290

2 Claims. (Cl. 198—168)

This invention relates to a machine tool and particularly to a semiautomatic lathe for high production work. This application is a continuation in part of my copending application Serial No. 670,794 filed May 18, 1946.

The lathe of the present invention includes a novel bed arrangement wherein the working space for receiving workpieces is unobstructed whereby the workpieces may be more readily inserted and removed from the machine and, if the workpieces are of such size as require conveying means, they may be brought into position without interference. The bed is provided with a chip and coolant removal means including an opening extending under the workpieces for the full length of the working space for receiving chips and coolant from the workpiece and for conducting the chips from the working space to the back of the machine for removal therefrom without obstructing the working space or interfering with the work positioned therein.

The chips can be moved by gravity to the back of the machine, can be conveyed from beneath the opening by means of a conveyor, or both as required.

Other features and advantages of the present invention will be apparent from the specification and claims when considered in connection with the drawings in which:

Figure 1 is a back view of the machine.

Fig. 2 is a vertical transverse section through the machine.

Fig. 3 is a plan view of the conveyor.

Fig. 4 is a sectional view taken along line 4—4 of Fig. 3.

Fig. 5 is a sectional view taken along line 5—5 of Fig. 3.

The lathe of the present invention has a frame provided with end pedestals 10, 11. The pedestal 11 has mounted therein a driven work chuck 12. The frame has a main bed 13 for supporting a tailstock 14 and a back carriage structure 15 and is provided with a top bed 16 mounted above the main bed on the pedestals 10, 11 for carrying an overhead tool carriage 17.

With the elements arranged as shown in Figs. 1 and 2, it will be seen that the lathe is entirely open in the front between the chuck 12 and tailstock 14 and provides a work space therebetween to receive a workpiece without obstruction by the usual front tool carriage or operating means usually found on such machines. Thus work can be readily moved from a conveying means or other work transporting means (not shown) into work supporting position and may be removed from said position readily so that the machine is particularly well suited for high speed production work.

Specifically, the main bed 13 is provided with ways 18 on which the tailstock 14 is mounted for adjustment toward and away from the headstock and clamped in adjusted position by means of the bolts (not shown). The main bed 13 also has ways 19 on which the rear tool carriage 15 slides longitudinally to the required position in which the tool is moved toward and from the workpiece during the cycle of operation on the work.

The top bed 16 is preferably of substantially rectangular cross-section as shown in Figs. 1 and 2 and may have a rib or fillet 20 extending along the top thereof as required. The top bed has on its face a pair of ways 21 for supporting the overhead tool carriage 17 for longitudinal movement along the work.

The frame with its main bed and top bed may be made from suitable castings or may be fabricated from welded sheet stock as desired and as is shown encloses the operating mechanism of the machine.

The present invention provides for the efficient removal of chips and coolant without requiring the stoppage of the machine or in any way obstructing the working space. This is accomplished by providing the main bed under the work space with an opening 22, Fig. 2, which extends between the pedestals for the full length of the working space for receiving the chips produced during a cutting operation and also for receiving the usual coolant which is projected onto the work during said operation.

This opening is directly below the workpiece and is of such a width that the chips produced by the overhead and rear cutting tools and the coolant drop therethrough by gravity and into the passage 23 which extends downwardly and rearwardly to the back of the machine and terminates in an opening 24 extending across the back of the machine as shown in Fig. 1 through which the chips may be removed. It will be seen that the chips are collected and delivered to a point at the back of the machine from which they can be removed into a suitable chip disposal means without requiring stoppage of the machine or without interference with the progress of the work on a workpiece.

If desired, the passage may be provided with one or more reinforcing ribs 25 which tie the main bed together and separate the chip receiving passage into two or more sections, thus aiding in the distribution of the chips as they fall and preventing them from being dragged or carried to one end of the opening.

The machine of the present invention can be arranged so that the chips are removed manually or so that the chips are automatically removed from the passage or manually removed from one-half of the passage and automatically from the other half of the passage as shown in Fig. 1. In the section from which the chips are removed manually, it is preferred to provide a lip 26 which prevents the chips and coolant from falling out, the inner surface 27 of the lip being upwardly inclined to aid in chip removal. The bottom of the frame at the lower end of the passage 23 is provided with a strainer 28 through which the coolant may be separated from the chips and pass into a coolant receiving duct 29 to be returned to the coolant supply. The lip will retain the chips in the passage until an operator manually removes the same.

As herein illustrated the part of the passage on the other side of the rib 25 is provided with automatic means for discharging the chips. This comprises a conveyor means 30 mounted therein so as to extend into the passage with its end projecting through an opening 31 formed in the wall of the passage so that the end of the conveyor lies under the opening 22. The other end of the conveyor rests on the lip 26 so that the conveyor extends beyond the back of the machine so that chips are removed from the passage and carried out to be deposited automatically in chip removal conveyances.

The conveyor comprises side frames 32 having shafts 33, 34 mounted thereon, adjacent the ends thereof to extend therebetween, shaft 33 being nonrotatably clamped to the side frames and shaft 34 being rotatably mounted in bearings 35 carried by slides 35a. Shaft 33 has a pair of supporting blocks 36 secured thereto by set screws or the like 37 and shaft 34 has a similar pair of supporting blocks 38 mounted thereon for relative rotation with respect thereto. In the preferred form of the invention an endless band 39 is positioned around the supporting blocks and forms a chip receiving table extending for the length of the conveying means. By adjusting the slides 35a by means of adjusting means 40, Fig. 2, the band is made taut and is held against movement by the friction between the belt and the fixed supporting blocks 36. The band has a flange 41 on each side of the upper reach thereof to prevent the chips from falling therefrom. The shaft 33 has a pair of sprockets 42 rotatably mounted thereon beside the table and between the blocks 36 and the side frame and shaft 34 has a pair of sprockets 43 similarly located and secured thereto for rotation therewith. The sprockets 42, 43 are connected by chains 44, 45 extending along the sides of the table, and each chain has fastened thereto at intervals cross bars 46, each having a downwardly projecting scraper flange 46a which overlies the table between the side flanges 41 thereof. Shaft 34 is driven by a motor 47 through chain 48 and a slip clutch mechanism 49 mounted on the end of the shaft. The slip clutch mechanism comprises a collar 50 keyed or pinned to the shaft and having spring-pressed balls 50a cooperating with recesses in the face of a sprocket 51 rotatable on the shaft and driven by the chain 48 to drive the shaft, said spring-pressed balls yielding to permit relative rotation between the collar and sprocket 51 when an overload is experienced. As the shaft 34 is rotated, it drives sprockets 43 and chains 44, 45 which move the flanges 46a over the table and scrapes the chips which have been disposed on the table off the table and out beyond the back of the machine.

Deflector plates 52 carried by the web 25 and the end of the pedestal 11 extend over the chains 44, 45 and protect them from falling chips. The plates direct the chips falling into the passage onto the table and a blade 53 connected to the front wall of the passage overlies the edge of the opening 31 and directs the chips sliding down the front wall of the passage rearwardly onto the table. These elements insure that the chips will be positioned on the table to be engaged by the scrapers and removed thereby.

Variations and modifications may be made within the scope of this invention and portions of the improvements may be used without others.

I claim:

1. A chip conveyor for use with a metal working machine having a chip-receiving opening comprising a frame having one end adapted to be supported under said opening; a shaft at each end of the frame; a taut endless band stretched between and supported by said shafts to form a chip-receiving table, one of said shafts being fixed against rotation and holding said band against movement and the other shaft being rotatable and having drive means therefor; an endless member positioned adjacent each side of the band and driven by said other shaft; and a plurality of cross bars each having a scraper member thereon carried by the endless members and movable over the band to scrape chips deposited thereon and discharge them from the other end of the frame.

2. A chip conveyor for use with a metal working machine having a chip-receiving opening comprising a frame having one end adapted to be supported under said opening; a shaft at each end of the frame; an endless band stretched between and supported by said shafts to form a chip-receiving table, one of said shafts being fixed against rotation and holding said band against movement and the other shaft being rotatable and having drive means therefor; endless chains positioned on each side of the band, and mounted on sprockets rotatable on said first shaft and connected to said other shaft to be driven thereby; and a plurality of cross bars each having a scraper member thereon carried by the chains and movable longitudinally over the band to scrape chips deposited thereon and discharge them from the other end of the frame.

EDMUND J. LOMAZZO.

REFERENCES CITED

The following references are of record in the file of this patent:

UNITED STATES PATENTS

| Number | Name | Date |
|---|---|---|
| 1,923,781 | Flanders | Aug. 22, 1933 |
| 1,926,997 | Hoelscher et al. | Sept. 12, 1933 |
| 2,124,216 | Tessky | July 19, 1938 |
| 2,493,451 | Gaddis | Jan. 3, 1950 |

FOREIGN PATENTS

| Number | Country | Date |
|---|---|---|
| 12,063 of 1901 | Great Britain | June 13, 1901 |
| 507,377 | Germany | Sept. 15, 1930 |
| 327,655 | Italy | July 17, 1935 |